United States Patent
Qiao et al.

(10) Patent No.: US 10,673,551 B2
(45) Date of Patent: Jun. 2, 2020

(54) TIME SYNCHRONIZATION METHOD AND APPARATUS

(71) Applicant: Huawei Technologies Co., Ltd., Shenzhen (CN)

(72) Inventors: Lizhong Qiao, Beijing (CN); Yawei Zhang, Beijing (CN); Huanle Wang, Beijing (CN); Dejian Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 15/625,649

(22) Filed: Jun. 16, 2017

(65) Prior Publication Data

US 2017/0288802 A1    Oct. 5, 2017

Related U.S. Application Data

(63) Continuation of application No. PCT/CN2014/093933, filed on Dec. 16, 2014.

(51) Int. Cl.
*H04J 3/06*    (2006.01)

(52) U.S. Cl.
CPC .......... *H04J 3/0667* (2013.01); *H04J 3/0673* (2013.01); *H04J 3/0682* (2013.01)

(58) Field of Classification Search
CPC ...... H04J 3/0667; H04J 3/0682; H04J 3/0673; H04L 7/00; H04L 29/06
See application file for complete search history.

(56) References Cited

U.S. PATENT DOCUMENTS

| | | | |
|---|---|---|---|
| 7,649,912 B2 | 1/2010 | Balasubramanian et al. | |
| 8,416,763 B1 * | 4/2013 | Montini | H04J 3/0667 370/350 |

(Continued)

FOREIGN PATENT DOCUMENTS

| | | |
|---|---|---|
| CN | 101404618 A | 4/2009 |
| CN | 101616163 A | 12/2009 |

(Continued)

OTHER PUBLICATIONS

Machine Translation and Abstract of Chinese Publication No. CN101616163, dated Dec. 30, 2009, 9 pages.

(Continued)

*Primary Examiner* — Will W Lin
(74) *Attorney, Agent, or Firm* — Conley Rose, P.C.

(57) ABSTRACT

A time synchronization method includes, a boundary device of a third-party network side receives a synchronization packet carrying a time synchronization offset and is delivered by a boundary device of an upstream network side on the basis that boundary devices in an entire network are all boundary clock (BC) devices, where the time synchronization offset is a time offset between a time domain of the upstream network and a time domain of the third-party network, and the boundary device of the third-party network side transparently transmits the synchronization packet carrying the time synchronization offset to a boundary device of a downstream network side such that the boundary device of the downstream network side performs time synchronization with the boundary device of the upstream network side according to the time synchronization offset. Thus time synchronization among multiple time domains in a network.

6 Claims, 12 Drawing Sheets

(56) References Cited

U.S. PATENT DOCUMENTS

| | | | |
|---|---|---|---|
| 2011/0051754 A1* | 3/2011 | Lansdowne | H04J 3/0673 370/503 |
| 2011/0075685 A1* | 3/2011 | Xu | H04L 27/2663 370/503 |
| 2012/0263264 A1 | 10/2012 | Peng | |
| 2013/0100832 A1* | 4/2013 | Flinn | H04L 43/0852 370/252 |
| 2013/0163617 A1* | 6/2013 | Chandra | H04J 3/0667 370/503 |
| 2013/0279525 A1* | 10/2013 | Zheng | H04J 3/0667 370/516 |
| 2014/0010244 A1* | 1/2014 | Bui | H04J 3/0667 370/503 |
| 2014/0089666 A1 | 3/2014 | Kim et al. | |
| 2014/0169792 A1* | 6/2014 | Lee | H04J 3/0673 398/66 |
| 2015/0092793 A1* | 4/2015 | Aweya | H04J 3/0685 370/503 |
| 2015/0092794 A1* | 4/2015 | Aweya | H04J 3/0667 370/503 |
| 2015/0092796 A1* | 4/2015 | Aweya | H04J 3/0667 370/516 |
| 2015/0092797 A1* | 4/2015 | Aweya | H04J 3/0667 370/516 |
| 2015/0215108 A1 | 7/2015 | Xu et al. | |
| 2015/0257024 A1* | 9/2015 | Baid | H04W 24/10 370/338 |
| 2015/0295669 A1* | 10/2015 | Chapman | H04L 5/0007 370/503 |
| 2016/0080100 A1 | 3/2016 | Yan et al. | |
| 2016/0149658 A1* | 5/2016 | Xia | H04L 41/06 370/217 |
| 2016/0170437 A1* | 6/2016 | Aweya | H04J 3/0667 713/503 |
| 2016/0170439 A1* | 6/2016 | Aweya | G06F 1/12 713/401 |
| 2016/0170440 A1* | 6/2016 | Aweya | G06F 1/12 713/503 |
| 2017/0214479 A1* | 7/2017 | Heine | H04J 3/0673 |

FOREIGN PATENT DOCUMENTS

| | | |
|---|---|---|
| CN | 102404104 A | 4/2012 |
| CN | 102469377 A | 5/2012 |
| CN | 102761407 A | 10/2012 |
| CN | 102957528 A | 3/2013 |
| CN | 103139002 A | 6/2013 |
| CN | 103312428 A | 9/2013 |
| CN | 103378916 A | 10/2013 |
| CN | 103634091 A | 3/2014 |
| CN | 103634208 A | 3/2014 |
| CN | 103684648 A | 3/2014 |
| EP | 2744130 A2 | 6/2014 |
| EP | 2750339 A1 | 7/2014 |
| WO | 2012016507 A1 | 2/2012 |

OTHER PUBLICATIONS

Machine Translation and Abstract of Chinese Publication No. CN103378916, dated Oct. 30, 2013, 14 pages.

Machine Translation and Abstract of Chinese Publication No. CN103684648, dated Mar. 26, 2014, 11 pages.

"IEEE Standard for a Precision Clock Synchronization Protocol for Networked Measurement and Control Systems, IEEE Instrumentation and Measurement Society," IEEE Std 1588, Jul. 24, 2008, 289 pages.

Foreign Communication From A Counterpart Application, PCT Application No. PCT/CN2014/093933, English Translation of International Search Report dated Sep. 22, 2015, 2 pages.

Foreign Communication From A Counterpart Application, PCT Application No. PCT/CN2014/093933, English Translation of Written Opinion dated Sep. 22, 2015, 6 pages.

Pallec, M., et al., "Time and Frequency Distribution Over Packet Switched Networks," XP011628247, Bell Labs Technical Journal, vol. 14, No. 2, Jul. 2009, 24 pages.

Foreign Communication From A Counterpart Application, European Application No. 14908134.1, Extended European Search Report dated Nov. 27, 2017, 10 pages.

Machine Translation and Abstract of Chinese Publication No. CN102404104, dated Apr. 4, 2012, 14 pages.

Foreign Communication From A Counterpart Application, Chinese Application No. 201480077464.0, Chinese Office Action dated Jan. 3, 2019, 16 pages.

Machine Translation and Abstract of Chinese Publication No. CN101404618, dated Apr. 8, 2009, 12 pages.

Machine Translation and Abstract of Chinese Publication No. CN102469377, dated May 23, 2012, 12 pages.

Machine Translation and Abstract of Chinese Publication No. CN102761407, dated Oct. 31, 2012, 17 pages.

Machine Translation and Abstract of Chinese Publication No. CN103634091, dated Mar. 12, 2014, 44 pages.

Machine Translation and Abstract of Chinese Publication No. CN103634208, dated Mar. 12, 2014, 28 pages.

Foreign Communication From A Counterpart Application, Chinese Application No. 201480077464.0, Chinese Notice of Allowance dated Dec. 6, 2019, 4 pages.

* cited by examiner

TIME SYNCHRONIZATION METHOD AND APPARATUS

CROSS-REFERENCE TO RELATED APPLICATION

This application is a continuation of International Patent Application No. PCT/CN2014/093933 filed on Dec. 16, 2014, which is hereby incorporated by reference in its entirety.

TECHNICAL FIELD

The present application relates to the field of network communications technologies, and in particular, to a time synchronization method and apparatus.

BACKGROUND

The Institute of Electrical and Electronics Engineers (IEEE) protocol organization has proposed the IEEE1588V2 Precision Time Protocol (PTP), and this protocol may implement time synchronization precision at a sub-microsecond level.

In an internet protocol radio access network (IPRAN), entire-network time synchronization has become an indispensable configuration. Currently, a mainstream entire-network time synchronization solution is an IEEE1588V2 boundary clock (BC) solution, when an IEEE1588V2 BC is used for entire-network time synchronization, clocks in an entire network can be synchronized only with a same time source, multiple time sources cannot coexist, and separate synchronization of multiple clock domains cannot be implemented.

In the IEEE1588 standard, a solution that supports multi-time domains transmission is applying a transparent clock (TC) device. In a TC mode, the TC device supports time transparent transmission, such a scenario may support synchronization of multiple time domains, but TC devices themselves cannot perform time synchronization. As a traversed network, the TC devices themselves lose a capability of time synchronization. Therefore, entire-network time synchronization cannot be implemented.

It can be seen that, as a third-party network, either BC devices in an entire network are selected to perform entire-network time synchronization without support for time transparent transmission, or a TC device is selected to support time transparent transmission without support for entire-network time synchronization. Therefore, a networking scenario is severely limited.

The other approaches cannot implement the scenario, where multiple time domains need to exist in a network, time transparent transmission is required between the time domains, and time synchronization needs to be performed within the multiple time domains.

SUMMARY

Embodiments of the present application provide a time synchronization method and apparatus, which can implement multiple time domains in a network, and implement time synchronization among the multiple time domains.

To resolve the foregoing technical problems, the embodiments of the present application disclose the following technical solutions:

According to a first aspect, a time synchronization method is provided, including receiving, by a boundary device of a third-party network side, a synchronization packet that carries a time synchronization offset and is delivered by a boundary device of an upstream network side on the basis that boundary devices in an entire network are all BC devices, where the time synchronization offset is a time offset between a time domain of the upstream network and a time domain of the third-party network, and transparently transmitting, by the boundary device of the third-party network side, the synchronization packet that carries the time synchronization offset to a boundary device of a downstream network side such that the boundary device of the downstream network side performs time synchronization with the boundary device of the upstream network side according to the time synchronization offset.

With reference to the foregoing first aspect, in a first possible implementation manner, receiving, by a boundary device of a third-party network side, a synchronization packet that carries a time synchronization offset and is delivered by a boundary device of an upstream network side includes sending, by a second BC device of the boundary device of the third-party network side using a second PTP port that is preset to a master clock (Master) state, a synchronization packet to a first PTP port that is of a first BC device of the boundary device of the upstream network side and is preset to a passive clock (Passive) state or a monitor clock (Monitor) state, receiving, by the second BC device using the second PTP port, a peer delay-request packet that is sent by the first BC device using the first PTP port, sending, by the second BC device, a peer delay-response packet to the first PTP port of the first BC device using the second PTP port, and receiving, by the second BC device using the second PTP port, the synchronization packet that carries the time synchronization offset and is sent by the first BC device using the first PTP port, where the first BC device is an interface device that interfaces with the boundary device of the third-party network side and is in the upstream network, and the second BC device is an interface device that interfaces with the boundary device of the upstream network side and is in the third-party network.

With reference to the foregoing first aspect, in a second possible implementation manner, receiving, by a boundary device of a third-party network side, a synchronization packet that carries a time synchronization offset and is delivered by a boundary device of an upstream network side includes sending, by a second BC device of the boundary device of the third-party network side using a second PTP port that is preset to a Master state, a synchronization packet to a first PTP port that is of a first BC device of the boundary device of the upstream network side and is preset to a Monitor state, receiving, by the second BC device using the second PTP port, a delay-request packet that is sent by the first BC device using the first PTP port, sending, by the second BC device, a delay-response packet to the first BC device using the second PTP port, and receiving, by the second BC device using the second PTP port, the synchronization packet that carries the time synchronization offset and is sent by the first BC device using the first PTP port, where the first BC device is an interface device that interfaces with the boundary device of the third-party network side and is in the upstream network, and the second BC device is an interface device that interfaces with the boundary device of the upstream network side and is in the third-party network.

With reference to the foregoing first aspect, and the first or the second possible implementation manner, in a third possible implementation manner, transparently transmitting, by the boundary device of the third-party network side, the synchronization packet that carries the time synchronization offset to a boundary device of a downstream network side includes sending, by the second BC device using the second PTP port, the synchronization packet that carries the time synchronization offset to a third PTP port that is of a third BC device and is preset to a Master state, and transparently transmitting, by the third BC device, the synchronization packet to the boundary device of the downstream network side, where the third BC device is an interface device that interfaces with the boundary device of the downstream network side and is in the third-party network.

According to a second aspect, a time synchronization method is provided, including on the basis that boundary devices in an entire network are all BC devices, determining, by a boundary device of an upstream network side, a time synchronization offset from a time domain of a third-party network, where the time synchronization offset is a time offset between a time domain of the upstream network and the time domain of the third-party network, and delivering, by the boundary device of the upstream network side, a synchronization packet that carries the time offset to a boundary device of the third-party network side such that the boundary device of the third-party network side transparently transmits the synchronization packet to a boundary device of a downstream network side, and the boundary device of the downstream network side performs time synchronization with the boundary device of the upstream network side according to the time synchronization offset.

With reference to the foregoing second aspect, in a first possible implementation manner, determining, by a boundary device of an upstream network side, a time synchronization offset from a time domain of a third-party network includes receiving, by a first BC device of the boundary device of the upstream network side using a first PTP port that is preset to a Passive state or a Monitor state, a synchronization packet that is sent by a second BC device of the boundary device of the third-party network side using a second PTP port that is preset to a Master state, sending, by the first BC device, a peer delay-request packet to the second PTP port of the second BC device using the first PTP port, receiving, by the first BC device using the first PTP port, a peer delay-response packet that is sent by the second BC device using the second PTP port, determining, by the first BC device, a mean path delay according to timestamp information generated by the peer delay-request packet and the peer delay-response packet, determining, by the first BC device, the time synchronization offset according to the mean path delay and timestamp information that is generated by the synchronization packet, and sending, by the first BC device using the first PTP port, the synchronization packet that carries the time synchronization offset to the second PTP port of the second BC device, where the first BC device is an interface device that interfaces with the boundary device of the third-party network side and is in the upstream network, and the second BC device is an interface device that interfaces with the boundary device of the upstream network side and is in the third-party network.

With reference to the foregoing second aspect, in a second possible implementation manner, determining, by a boundary device of an upstream network side, a time synchronization offset from a time domain of a third-party network includes receiving, by a first BC device of the boundary device of the upstream network side using a first PTP port that is preset to a Monitor state, a synchronization packet that is sent by a second BC device of the boundary device of the third-party network side using a second PTP port that is preset to a Master state, sending, by the first BC device, a delay-request packet to the second PTP port of the second BC device using the first PTP port, receiving, by the first BC device using the first PTP port, a delay-response packet sent by the second PTP port of the second BC device, determining, by the first BC device, a mean path delay according to timestamp information generated by the delay-request packet and the delay-response packet, determining, by the first BC device, the time synchronization offset according to the mean path delay and timestamp information that is generated by the synchronization packet, and sending, by the first BC device using the first PTP port, the synchronization packet that carries the time synchronization offset to the second PTP port of the second BC device, where the first BC device is an interface device that interfaces with the boundary device of the third-party network side and is in the upstream network, and the second BC device is an interface device that interfaces with the boundary device of the upstream network side and is in the third-party network.

According to a third aspect, a time synchronization method is provided, including receiving, by a boundary device of a downstream network side, a synchronization packet that carries a time synchronization offset, is sent by a boundary device of an upstream network side, and is transparently transmitted by a boundary device of a third-party network side on the basis that boundary devices in an entire network are all BC devices, where the time synchronization offset is a time offset between a time domain of the upstream network and a time domain of the third-party network, and performing, by the boundary device of the downstream network side, time synchronization with the boundary device of the upstream network side according to the time synchronization offset.

With reference to the foregoing third aspect, in a first possible implementation manner, performing, by the boundary device of the downstream network side, time synchronization with the boundary device of the upstream network side according to the time synchronization offset includes receiving, by a fourth BC device of the boundary device of the downstream network side using a fourth PTP port that is preset to a slave clock (Slave) state, the synchronization packet that carries the time synchronization offset and is sent by a third BC device of the boundary device of the third-party network side using a third PTP port that is preset to a Master state, determining, by the fourth BC device, a preliminary clock adjustment value for time synchronization with the third BC device, and setting, by the fourth BC device, a sum of the time synchronization offset and the clock adjustment value as a final clock adjustment value, and performing clock adjustment according to the final clock adjustment value, where the third BC device is an interface device that interfaces with the boundary device of the downstream network side and is in the third-party network, and the fourth BC device is an interface device that interfaces with the boundary device of the third-party network side and is in the downstream network.

According to a fourth aspect, a time synchronization device is provided, including a receiving unit configured to receive a synchronization packet that carries a time synchronization offset and is delivered by a boundary device of an upstream network side, where the time synchronization offset is a time offset between a time domain of the upstream network and a time domain of the third-party network, and a transparent transmission unit configured to transparently transmit the synchronization packet that carries the time synchronization offset to a boundary device of a downstream network side such that the boundary device of the downstream network side performs time synchronization with the boundary device of the upstream network side according to the time synchronization offset.

With reference to the foregoing fourth aspect, in a first possible implementation manner, the receiving unit is a second BC device whose second PTP port is preset to a Master state, where the second BC device sends, using the second PTP port, a synchronization packet to a first PTP port that is of a first BC device of the boundary device of the upstream network side and is preset to a Passive state or a Monitor state, receives a peer delay-request packet that is sent by the first BC device using the first PTP port, sends a peer delay-response packet to the first BC device, and receives the synchronization packet that carries the time synchronization offset and is sent by the first BC device using the first PTP port, where the first BC device is an interface device that interfaces with the boundary device of the third-party network side and is in the upstream network, and the second BC device is an interface device that interfaces with the boundary device of the upstream network side and is in the third-party network.

With reference to the foregoing fourth aspect, in a second possible implementation manner, the receiving unit is a second BC device whose second PTP port is preset to a Master state, where the second BC device sends, using the second PTP port, a synchronization packet to a first PTP port that is of a first BC device of the boundary device of the upstream network side and is preset to a Monitor state, receives a delay-request packet that is sent by the first BC device using the first PTP port, sends a delay-response packet to the first BC device, and receives the synchronization packet that carries the time synchronization offset and is sent by the first BC device using the first PTP port, where the first BC device is an interface device that interfaces with the boundary device of the third-party network side and is in the upstream network, and the second BC device is an interface device that interfaces with the boundary device of the upstream network side and is in the third-party network.

With reference to the foregoing fourth aspect, and the first or the second possible implementation manner, in a third possible implementation manner, the transparent transmission unit is a third BC device whose third PTP port is preset to a Master state, where the third BC device receives, using the third PTP port, the synchronization packet that carries the time synchronization offset and is sent by the second BC device using the second PTP port, and transparently transmits the synchronization packet to the boundary device of the downstream network side, where the third BC device is an interface device that interfaces with the boundary device of the downstream network side and is in the third-party network.

According to a fifth aspect, a time synchronization BC device is provided, including a time synchronization offset determining unit configured to determine a time synchronization offset from a time domain of a third-party network, where the time synchronization offset is a time offset between a time domain of the upstream network and the time domain of the third-party network, and a packet sending unit configured to deliver a packet that carries the time offset to a boundary device of the third-party network side such that the boundary device of the third-party network side transparently transmits the packet to a boundary device of a downstream network side, and the boundary device of the downstream network side performs time synchronization with a boundary device of the upstream network side according to the time synchronization offset.

With reference to the foregoing fifth aspect, in a first possible implementation manner, the time synchronization offset determining unit further receives, using a first PTP port that is preset to a Passive state or a Monitor state, a synchronization packet that is sent by a second BC device of the boundary device of the third-party network side using a second PTP port that is preset to a Master state, sends a peer delay-request packet to the second PTP port of the second BC device using the first PTP port, receives, using the first PTP port, a peer delay-response packet that is sent by the second BC device using the second PTP port, determines a mean path delay according to timestamp information generated by the peer delay-request packet and the peer delay-response packet, determines the time synchronization offset according to the mean path delay and timestamp information that is generated by the synchronization packet, and sends, using the first PTP port, the synchronization packet that carries the time synchronization offset to the second PTP port of the second BC device, where the second BC device is an interface device that interfaces with the boundary device of the upstream network side and is in the third-party network.

With reference to the foregoing fifth aspect, in a second possible implementation manner, the time synchronization offset determining unit further receives, using a first PTP port that is preset to a Monitor state, a synchronization packet that is sent by a second BC device of the boundary device of the third-party network side using a second PTP port that is preset to a Master state, sends a delay-request packet to the second PTP port of the second BC device using the first PTP port, receives, using the first PTP port, a delay-response packet sent by the second PTP port of the second BC device, determines a mean path delay according to timestamp information generated by the delay-request packet and the delay-response packet, determines the time synchronization offset according to the mean path delay and timestamp information that is generated by the synchronization packet, and sends, using the first PTP port, the synchronization packet that carries the time synchronization offset to the second PTP port of the second BC device, where the second BC device is an interface device that interfaces with the boundary device of the upstream network side and is in the third-party network.

According to a sixth aspect, a time synchronization BC device is provided, including a packet receiving unit configured to receive a synchronization packet that carries a time synchronization offset, is sent by a boundary device of an upstream network side, and is transparently transmitted by a boundary device of a third-party network side, where the time synchronization offset is a time offset between a time domain of the upstream network and a time domain of the third-party network, and a synchronizing unit configured to perform time synchronization with the boundary device of the upstream network side according to the time synchronization offset.

With reference to the foregoing sixth aspect, in a first possible implementation manner, the synchronizing unit further receives, using a fourth PTP port that is preset to a Slave state, the synchronization packet that carries the time synchronization offset and is sent by a third BC device of the boundary device of the third-party network side using a third PTP port that is preset to a Master state, determines a preliminary clock adjustment value for time synchronization with the third BC device, and sets a sum of the time synchronization offset and the clock adjustment value as a final clock adjustment value, and performs clock adjustment according to the final clock adjustment value, where the third BC device is an interface device that interfaces with the boundary device of the downstream network side and is in the third-party network.

According to a seventh aspect, a time synchronization processing apparatus is provided, including a receiver, a processor, and a memory, where the memory is configured to store a computer execution instruction. The receiver is configured to receive, on the basis that boundary devices in an entire network are all BC devices, a synchronization packet that carries a time synchronization offset and is delivered by a boundary device of an upstream network side, where the time synchronization offset is a time offset between a time domain of the upstream network and a time domain of the third-party network, and the processor is configured to execute the computer execution instruction stored in the memory, and transparently transmit the synchronization packet that carries the time synchronization offset to a boundary device of a downstream network side such that the boundary device of the downstream network side performs time synchronization with the boundary device of the upstream network side according to the time synchronization offset.

According to an eighth aspect, a time synchronization processing apparatus is provided, including a transmitter, a processor, and a memory, where the memory is configured to store a computer execution instruction. The processor is configured to execute the computer execution instruction stored in the memory, and determine, on the basis that boundary devices in an entire network are all BC devices, a time synchronization offset from a time domain of a third-party network, where the time synchronization offset is a time offset between a time domain of the upstream network and the time domain of the third-party network, and the transmitter is configured to deliver a packet that carries the time offset to a boundary device of the third-party network side such that the boundary device of the third-party network side transparently transmits the synchronization packet to a boundary device of a downstream network side, and the boundary device of the downstream network side performs time synchronization with a boundary device of the upstream network side according to the time synchronization offset.

According to a ninth aspect, a time synchronization processing apparatus is provided, including a receiver, a processor, and a memory, where the memory is configured to store a computer execution instruction. The receiver is configured to receive, on the basis that boundary devices in an entire network are all BC devices, a synchronization packet that carries a time synchronization offset, is sent by a boundary device of an upstream network side, and is transparently transmitted by a boundary device of a third-party network side, where the time synchronization offset is a time offset between a time domain of the upstream network and a time domain of the third-party network, and the processor is configured to execute the computer execution instruction stored in the memory, and perform time synchronization with the boundary device of the upstream network side according to the time synchronization offset.

In the embodiments of the present application, in a synchronization mode of BC devices in an entire network, after a boundary device of an upstream network side learns a time offset between a time domain of the boundary device of the upstream network side itself and a time domain of a boundary device of an intermediate third-party network side, the boundary device of the upstream network side delivers a synchronization packet that carries the time offset to the boundary device of the third-party network side, and the boundary device of the third-party network side transparently transmits the synchronization packet to a boundary device of a downstream network side such that the boundary device of the downstream network side may perform time synchronization with the boundary device of the upstream network side according to the time offset. Because the boundary device of the third-party network side does not internally perceive transparently transmitted time, and directly transparently transmits the packet, original time synchronization of the boundary device of the third-party network side is not affected, and time synchronization within multiple time domains can be implemented in a scenario in which the time domain of the boundary device of the third-party network side is traversed.

BRIEF DESCRIPTION OF DRAWINGS

To describe the technical solutions in the embodiments of the present application more clearly, the following briefly introduces the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

To make a person skilled in the art better understand the technical solutions in the embodiments of the present application, and make the objectives, features, and advantages of the embodiments of the present application clearer, the following further describes the technical solutions in the embodiments of the present application in detail with reference to the accompanying drawings.

Figure 1:
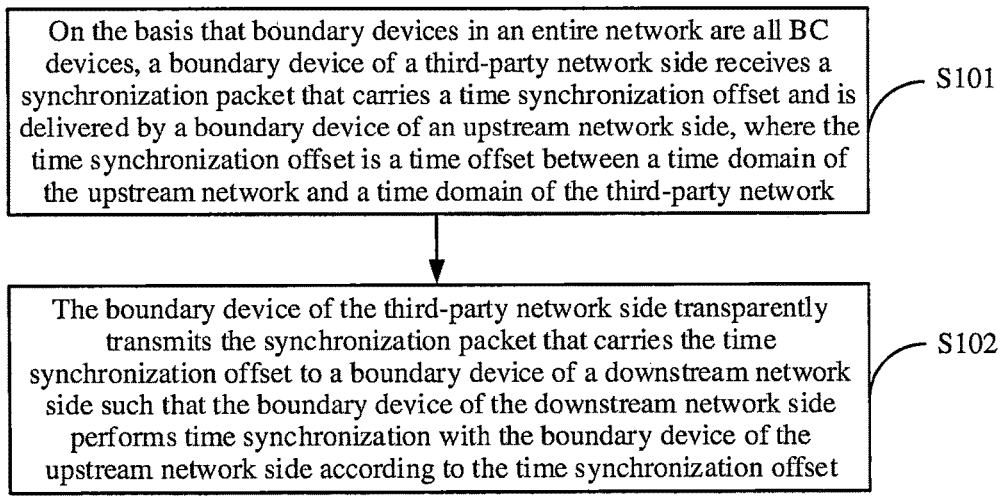
FIG. 1 is a schematic flowchart of a time synchronization method according to the present application.

As shown in FIG. 1, FIG. 1 is a schematic diagram of an embodiment of a time synchronization method according to the present application, and the method may include the following steps.

Step S101: On the basis that devices in an entire network are BC devices, a boundary device of a third-party network side receives a synchronization packet that carries a time synchronization offset and is delivered by a boundary device of an upstream network side, where the time synchronization offset is a time offset between a time domain of the upstream network and a time domain of the third-party network.

In this embodiment of the present application, a network located between the upstream network and a downstream network is referred to as a "third-party network". In this embodiment of the present application, boundary devices that perform synchronization packet interaction between both the upstream network and the third-party network, and boundary devices that perform synchronization packet interaction between both the third-party network and the downstream network are focused on, where a boundary device of the upstream network, a boundary device of the downstream network, and a boundary device of the third-party network are all BC devices. A time domain in which the boundary device of the third-party network side is located is different from a time domain in which the boundary device of the upstream network side is located. The boundary device of the upstream network side may learn the time offset between the time domain of the upstream network and the time domain of the third-party network.

After learning the time offset between the time domain of the upstream network and the time domain of the third-party network, the boundary device of the upstream network side may deliver the synchronization packet that carries the time offset to the boundary device of the third-party network side.

Step S102: The boundary device of the third-party network side transparently transmits the synchronization packet that carries the time synchronization offset to a boundary device of a downstream network side such that the boundary device of the downstream network side performs time synchronization with the boundary device of the upstream network side according to the time synchronization offset.

In step S102, after the boundary device of the third-party network side receives the synchronization packet that carries the time synchronization offset and is delivered by the boundary device of the upstream network side, the synchronization packet does not need to be processed and transparently transmitted time does not need to be perceived within the network, instead, internal transparent transmission is directly performed on the synchronization packet, and the synchronization packet is delivered to the boundary device of the downstream network side. Further, the boundary device of the upstream network side may add a source Internet Protocol (IP) address and a destination IP address to the delivered synchronization packet that carries the time synchronization offset, where the source IP address is an IP address of the boundary device of the upstream network side, and the destination IP address is an IP address of the boundary device of the downstream network side that receives the synchronization packet. In this way, the boundary device of the third-party network side may directly perform, on the synchronization packet, transparent transmission within the third-party network and deliver the synchronization packet to the boundary device of the downstream network side, according to the destination IP address in the synchronization packet.

Before receiving the synchronization packet that carries the time synchronization offset, the boundary device of the downstream network side traces a clock of the boundary device of the third-party network side. After receiving the synchronization packet that carries the time synchronization offset, the boundary device of the downstream network side performs clock correction on a basis of the original clock according to the received time synchronization offset, where a corrected clock is the same as a clock of the boundary device of the upstream network side, that is, time synchronization with the boundary device of the upstream network side is implemented.

In this embodiment of the present application, in a synchronization mode of BC devices in an entire network, after a boundary device of an upstream network side learns a time offset between a time domain of the boundary device of the upstream network side itself and a time domain of a boundary device of an intermediate third-party network side, the boundary device of the upstream network side delivers a synchronization packet that carries the time offset to the boundary device of the third-party network side, and the boundary device of the third-party network side transparently transmits the synchronization packet to a boundary device of a downstream network side such that the boundary device of the downstream network side may perform time synchronization with the boundary device of the upstream network side according to the time offset. Because the boundary device of the third-party network side does not internally perceive transparently transmitted time, and directly transparently transmits the packet, original time synchronization of the boundary device of the third-party network side is not affected, and time synchronization within multiple time domains can be implemented in a scenario in which the time domain of the boundary device of the third-party network side is traversed.

To facilitate understanding of this solution, the following describes in detail the foregoing technical solution using a specific implementation manner.

Figure 2:
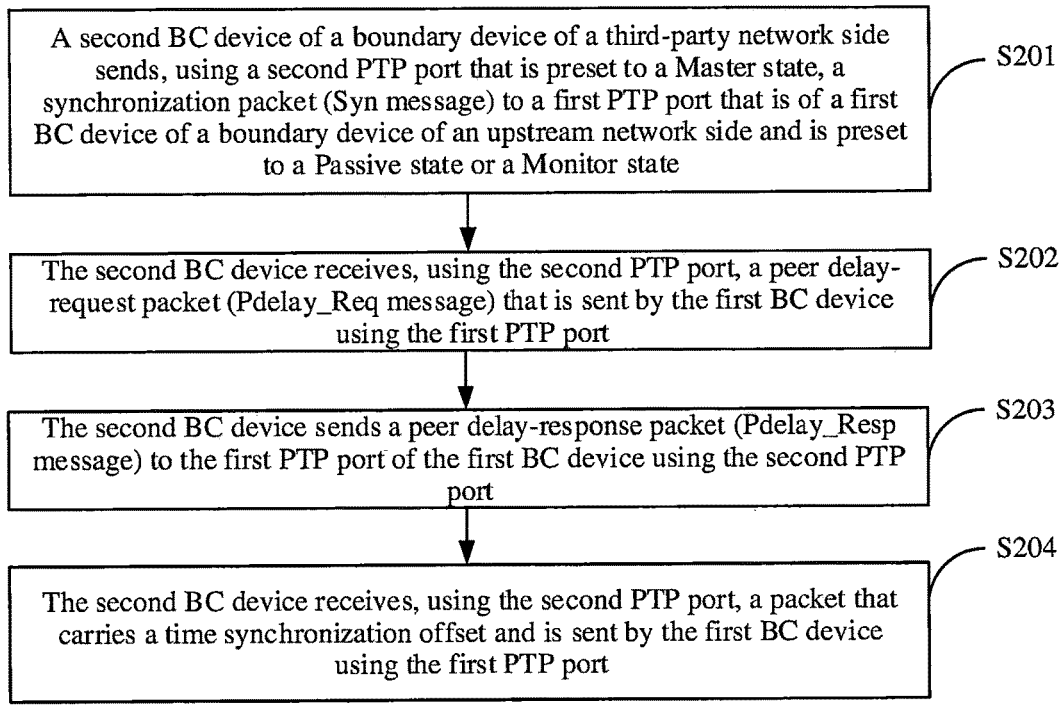
FIG. 2 is a schematic flowchart of specific implementation of step S101 in FIG. 1.

In a specific application scenario, a specific implementation process of receiving, by a boundary device of a third-party network side, a synchronization packet that carries a time synchronization offset and is delivered by a boundary device of an upstream network side in the foregoing step S101 is shown in FIG. 2, and includes the following steps.

Step S201: A second BC device of the boundary device of the third-party network side sends, using a second PTP port that is preset to a Master state, a synchronization packet (Syn message) to a first PTP port that is of a first BC device of the boundary device of the upstream network side and is preset to a Passive state or a Monitor state.

Step S202: The second BC device receives, using the second PTP port, a peer delay-request packet (Pdelay_Req message) that is sent by the first BC device using the first PTP port.

Step S203: The second BC device sends a peer delay-response packet (Pdelay_Resp message) to the first PTP port of the first BC device using the second PTP port.

Step S204: The second BC device receives, using the second PTP port, the packet that carries the time synchronization offset and is sent by the first BC device using the first PTP port.

The first BC device is an interface device that interfaces with the boundary device of the third-party network side and is in the upstream network, and the second BC device is an interface device that interfaces with the boundary device of the upstream network side and is in the third-party network. The interface devices herein are used to represent devices that are on both sides of a network and can perform synchronization packet interaction.

In the foregoing implementation manner, a setting manner of a PTP port of a related BC device is as follows. A PTP port of the second BC device is set to a Master state, and moreover, a PTP port of the first BC device is set to a Passive state in the 1588V2 standard, or is defined as a new port state, that is, a Monitor state. For ease of description, the PTP port of the first BC device is referred to as a "first PTP port", and the PTP port of the second BC device is referred to as a "second PTP port".

Figure 3:
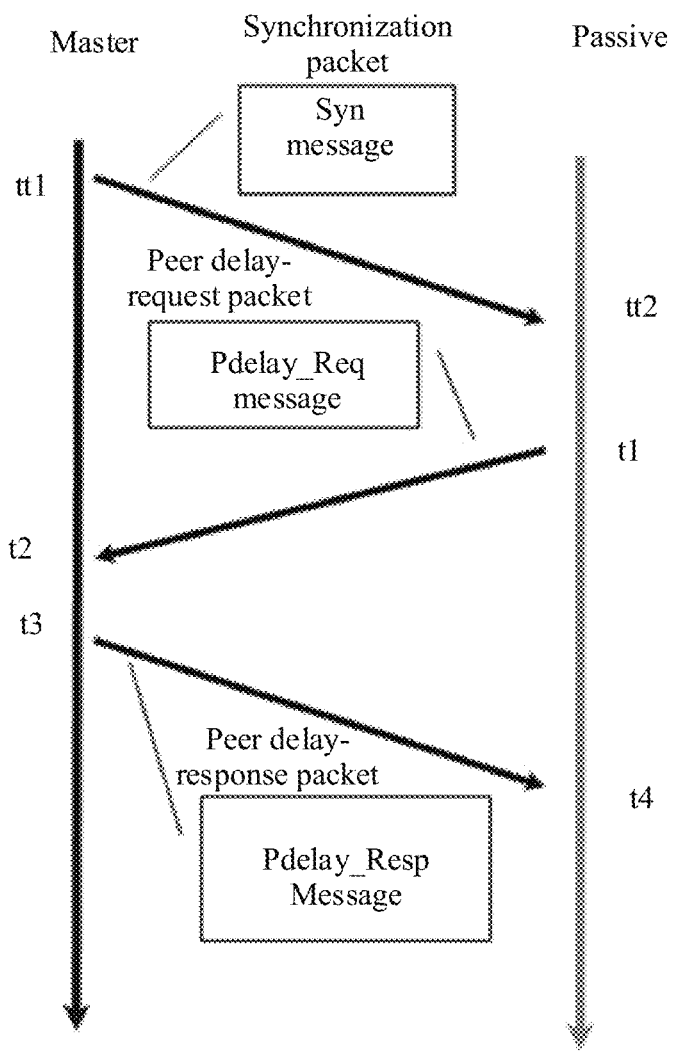
FIG. 3 is a schematic diagram of packet interaction between a PTP port of a first BC device and a PTP port of a second BC device according to the present application.

When the PTP port of the first BC device is set to a Passive state, and the PTP port of the second BC device is set to a Master state, packet interaction between the first BC device and the second BC device complies with a Pdelay delay mechanism, and the packet interaction between the two PTP ports is shown in FIG. 3. The second PTP port in the Master state sends a Syn message to the first PTP port in the Passive state, a timestamp that is of the Syn message packet and is generated at the second BC device is tt1, and a timestamp that is of the Syn message packet and is generated at the first BC device is tt2. The first PTP port in the Passive state sends a Pdelay_Req message to the second PTP port in the Master state at time t1. The second PTP port receives the Pdelay_Req message at time t2. The second PTP port in the Master state sends a Pdelay_Resp message to the first PTP port in the Passive state at time t3, and the first PTP port in the Passive state receives the Pdelay_Resp message at time t4.

It should be noted that, the first PTP port in the Passive state does not send a packet in a Delay mechanism mode, and may send a Pdelay_Peq message and a Pdelay_Resp message in the Pdelay delay mechanism mode. The third-party network needs to support the Pdelay delay mechanism when the first PTP port is set to the Passive state. A new state of the PTP port of the first BC device needs to be defined as the Monitor state when the third-party network supports only the Delay mechanism.

In addition, it should further be noted that, the boundary device of the upstream network side and the boundary device of the third-party network side interact with each other using synchronization packets. The boundary device of the upstream network side obtains timestamps carried in the synchronization packets and may learn a time offset between a time domain of the upstream network and a time domain of the third-party network according to the timestamps, and the boundary device of the upstream network side notifies the boundary device of the third-party network side of the time offset.

In this way, the first BC device may obtain an offset between the time domain of the upstream network and the time domain of the third-party network according to timestamp information of the packets. After the time offset is obtained, the first BC device sends, using the first PTP port in the Passive state, a packet that carries the offset to the second PTP port in the Master state of the second BC device.

In a process in which the first BC device obtains the offset between the time domain of the upstream network and the time domain of the third-party network according to the timestamp information of the packets, a mean path delay (meanPathDelay) needs to be first obtained. A calculation manner for the offset is as follows:

offset=(a delay of a Syn message)−meanPathDelay.

In the foregoing implementation manner, meanPathDelay=[($t2-t1$)+($t4-t3$)]/2=[($t2-t3$)+($t4-t1$)]/2, then, offset=($tt2-tt1$)−meanPathDelay.

Figure 4:
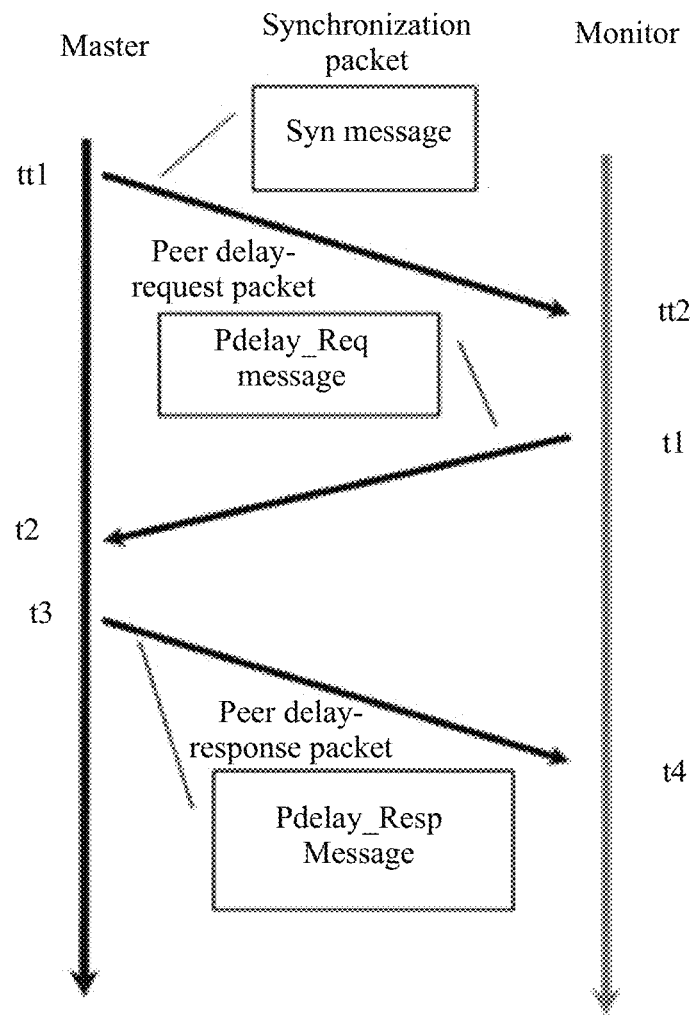
FIG. 4 is another schematic diagram of packet interaction between a PTP port of a first BC device and a PTP port of a second BC device according to the present application.

In another implementation manner, the PTP port of the second BC device, that is, the interface device that interfaces with the boundary device of the upstream network side and is in the third-party network, is still set to the Master state, and the PTP port of the first BC device, that is, the interface device that interfaces with the boundary device of the third-party network side and is in the upstream network, is set to the Monitor state. A PTP interface in the Monitor state may support two delay mechanisms, that is, Delay and Pdelay. In an actual application, the first BC device may select, according to the third-party network, a delay mechanism scheme that is the same as that of the third-party network. When the third-party network supports the Pdelay delay mechanism, packet interaction between the two PTP ports is shown in FIG. 4. The second PTP port in the Master state sends a Syn message to the first PTP port in the Monitor state, a timestamp that is of the Syn message packet and is generated at the second BC device is tt1, and a timestamp that is of the Syn message packet and is generated at the first BC device is tt2. The first PTP port in the Monitor state sends a Pdelay_Req message to the second PTP port in the Master state at time t1. The second PTP port receives the Pdelay_Req message at time t2. The second PTP port in the Master state sends a Pdelay_Resp message to the first PTP port in the Monitor state at time t3, and the first PTP port in the Monitor state receives the Pdelay_Resp message at time t4. In this way, the first BC device may obtain an offset between a time domain of the upstream network and a time domain of the third-party network according to timestamp information of packets. After the time offset is obtained, the first BC device sends, using the first PTP port in the Monitor state, a packet that carries the offset to the second PTP port in the Master state of the second BC device.

In this implementation manner, a calculation manner for the offset is as follows:

offset=(a delay of a Syn message)−meanPathDelay.

In the foregoing implementation manner, meanPathDelay=[($t2-t1$)+($t4-t3$)]/2=[($t2-t3$)+($t4-t1$)]/2, then, offset=($tt2-tt1$)−meanPathDelay.

Figure 5:
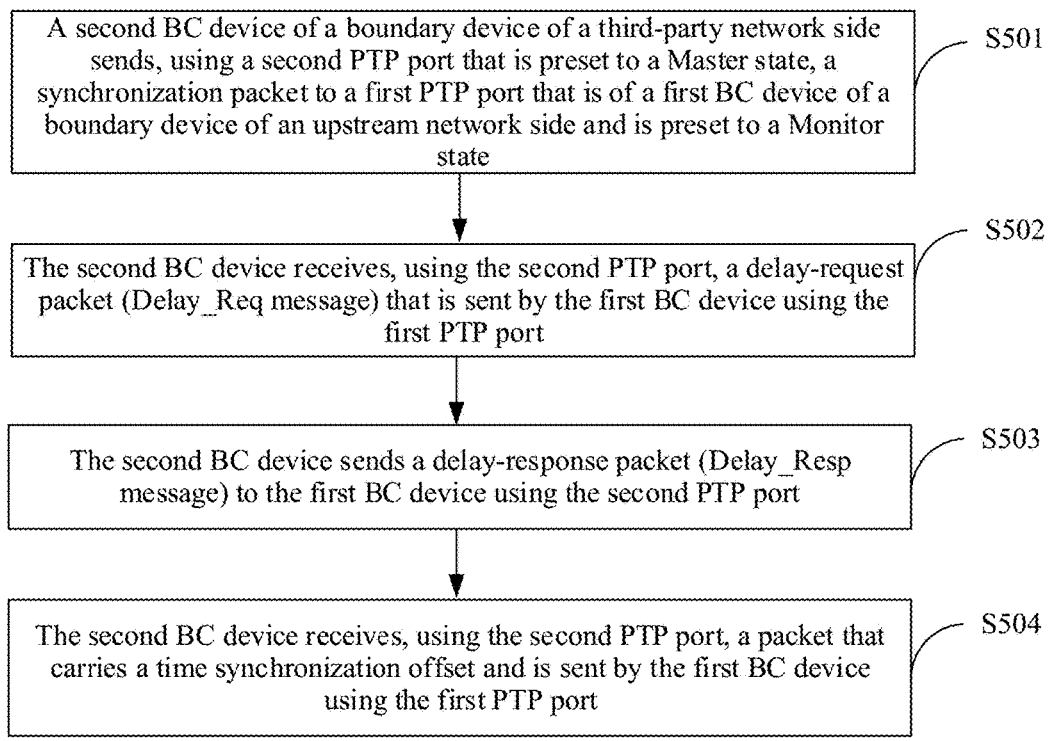
FIG. 5 is another schematic flowchart of specific implementation of step S101 in FIG. 1.

In addition, when the third-party network supports only the Delay mechanism, a specific implementation process of the receiving, by a boundary device of a third-party network side, a synchronization packet that carries a time synchronization offset and is delivered by a boundary device of an upstream network side in the foregoing step S101 is shown in FIG. 5, and includes the following steps.

Step S501: A second BC device of the boundary device of the third-party network side sends, using a second PTP port that is preset to a Master state, a synchronization packet to a first PTP port that is of a first BC device of the boundary device of the upstream network side and is preset to a Monitor state.

Step S502: The second BC device receives, using the second PTP port, a delay-request packet (delay_Req message) that is sent by the first BC device using the first PTP port.

Step S503: The second BC device sends a delay-response packet (Delay_Resp message) to the first BC device using the second PTP port.

Step S504: The second BC device receives, using the second PTP port, the packet that carries the time synchronization offset and is sent by the first BC device using the first PTP port.

The first BC device is an interface device that interfaces with the boundary device of the third-party network side and is in the upstream network, and the second BC device is an interface device that interfaces with the boundary device of the upstream network side and is in the third-party network.

Figure 6:
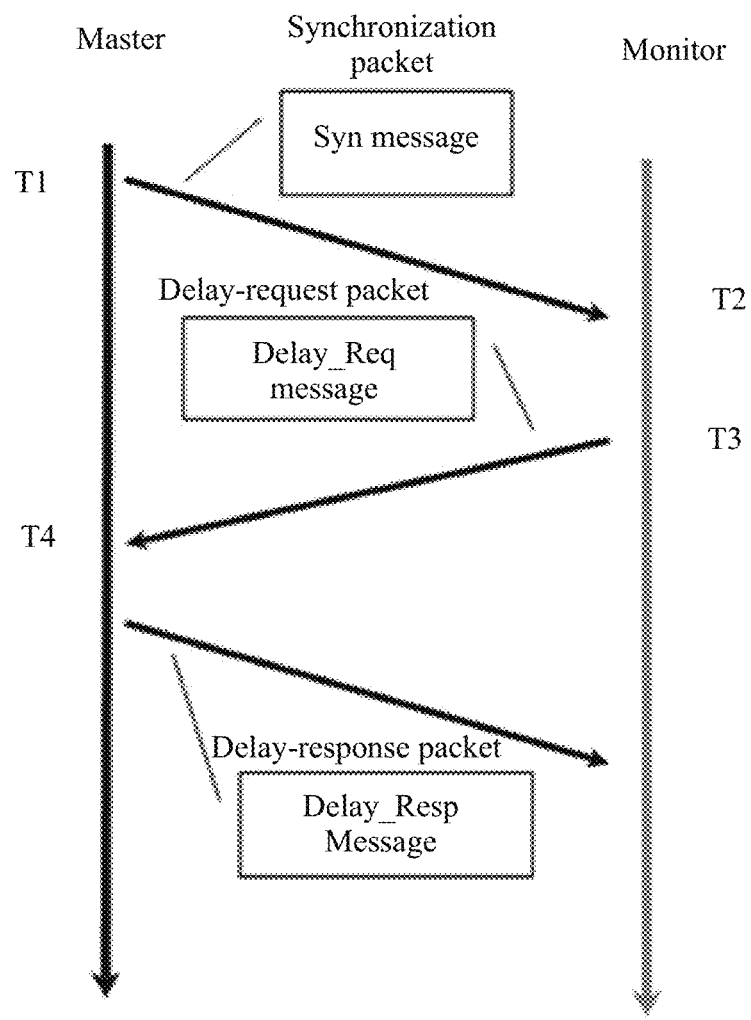
FIG. 6 is a schematic diagram of packet interaction between a PTP port of a first BC device and a PTP port of a second BC device in an implementation manner of FIG. 5.

In this implementation manner, when packet interaction between the first BC device and the second BC device complies with the Delay mechanism, and the packet interaction between the two PTP ports is shown in FIG. 6. The second PTP port in the Master state sends a Syn message to the first PTP port in the Monitor state at time T1. A timestamp that is of the Syn message packet and is generated at the second BC device is T1, and a timestamp that is of the Syn message packet and is generated at the first BC device is T2. The first PTP port in the Monitor state sends a Delay_Req message to the second PTP port in the Master state at time T3. The second PTP port receives the Delay_Req message at time T4. The, the second PTP port in the Master state sends a Delay_Resp message to the first PTP port in the Monitor state. Likewise, the first BC device may obtain an offset between a time domain of the upstream network and a time domain of the third-party network according to timestamp information of packets. After the time offset is obtained, the first BC device sends, using the first PTP port in the Monitor state, a packet that carries the offset to the second PTP port in the Master state of the second BC device.

A calculation manner for the offset is as follows:

offset=(a delay of a Syn message)−meanPathDelay.

In the foregoing implementation manner, meanPathDelay=[(T2−T1)+(T4−T3)]/2=[(T2−T3)+(T4−T1)]/2, then, offset=(T2−T1)−meanPathDelay.

In addition, a third BC device is further added to the third-party network and is used as an interface device that interfaces with the boundary device of the downstream network side and is in the third-party network. For ease of description, a PTP port of the third BC device is referred to as a "third PTP port". The third PTP port of the third BC device is preset to the Master state. Because PTP ports of the third BC device and the second BC device that are in the third-party network are preset to the Master state, after the third BC device receives the synchronization packet that carries the time synchronization offset and is sent by the second BC device, the third BC device does not perceive transparently transmitted time, and directly performs packet transparent transmission to transparently transmit the synchronization packet to the boundary device of the downstream network side. The boundary device of the downstream network side performs time synchronization with the boundary device of the upstream network side according to the time synchronization offset.

In the foregoing embodiments, an implementation procedure of time synchronization is described from the perspective of a boundary device of a third-party network side. The following makes related description about a time synchronization process from the perspective of a boundary device of an upstream network side.

Figure 7:
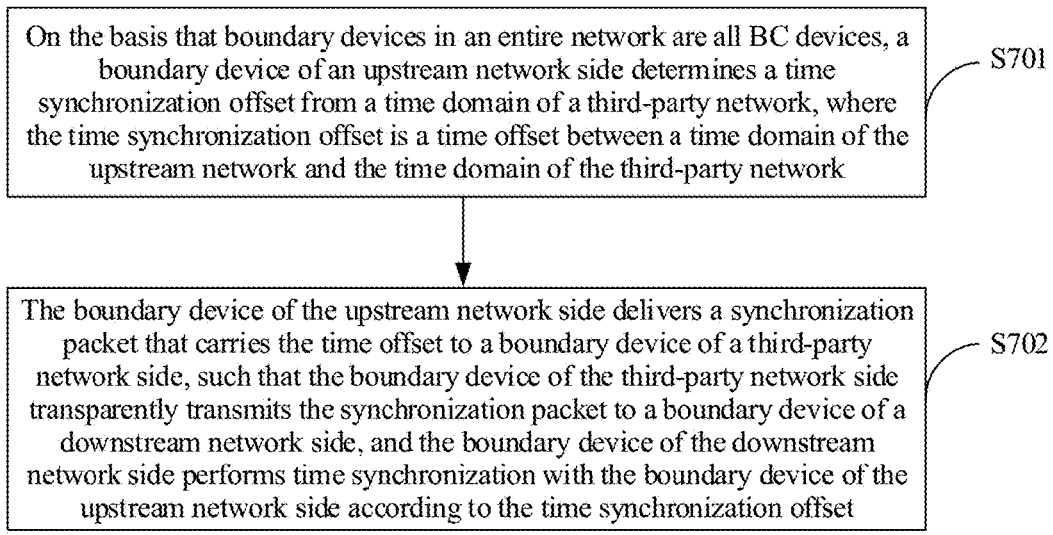
FIG. 7 is a schematic flowchart of time synchronization of a boundary device of an upstream network side according to the present application.

FIG. 7 is a procedure of time synchronization of a boundary device of an upstream network side, where the procedure includes the following steps.

Step S701: On the basis that boundary devices in an entire network are all BC devices, the boundary device of the upstream network side determines a time synchronization offset from a time domain of a third-party network, where the time synchronization offset is a time offset between a time domain of the upstream network and the time domain of the third-party network.

Step S702: The boundary device of the upstream network side delivers a synchronization packet that carries the time offset to a boundary device of the third-party network side such that the boundary device of the third-party network side transparently transmits the synchronization packet to a boundary device of a downstream network side, and the boundary device of the downstream network side performs time synchronization with the boundary device of the upstream network side according to the time synchronization offset.

In this embodiment of the present application, in a synchronization mode in which boundary devices in an entire network are all BC devices, after a boundary device of an upstream network side learns a time offset between a time domain of the boundary device of the upstream network side itself and a time domain of a boundary device of an intermediate third-party network side, the boundary device of the upstream network side delivers a synchronization packet that carries the time offset to the boundary device of the third-party network side, and the boundary device of the third-party network side transparently transmits the synchronization packet to a boundary device of a downstream network side such that the boundary device of the downstream network side may perform time synchronization with the boundary device of the upstream network side according to the time offset. Because the boundary device of the third-party network side does not internally perceive transparently transmitted time, and directly transparently transmits the packet, original time synchronization of the boundary device of the third-party network side is not affected, and time synchronization within multiple time domains can be implemented in a scenario in which the time domain of the boundary device of the third-party network side is traversed.

Figure 8:
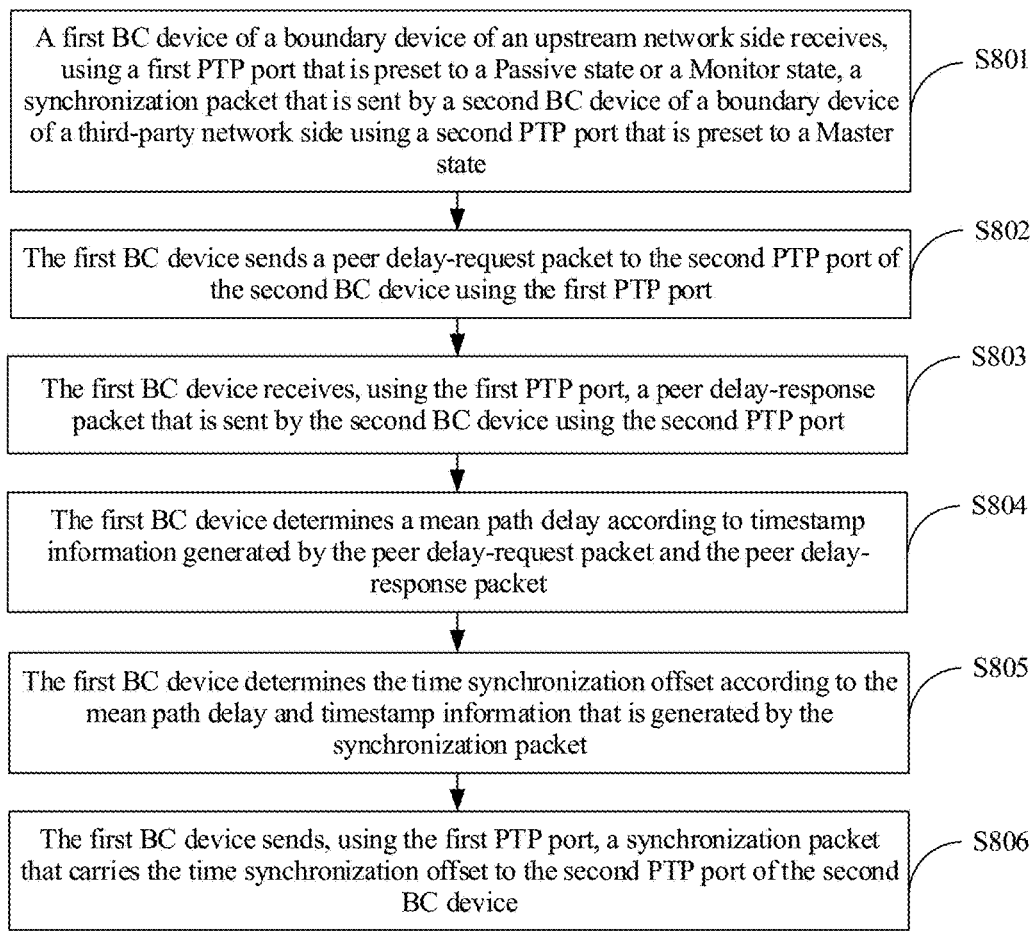
FIG. 8 is a schematic flowchart of implementation of step S701 in FIG. 7.

In a specific embodiment, as shown in FIG. 8, a procedure of determining, by the boundary device of the upstream network side, a time synchronization offset from a time domain of a third-party network may include the following steps.

Step S801: A first BC device of the boundary device of the upstream network side receives, using a first PTP port that is preset to a Passive state or a Monitor state, a synchronization packet that is sent by a second BC device of the boundary device of the third-party network side using a second PTP port that is preset to a Master state.

Step S802: The first BC device sends a peer delay-request packet to the second PTP port of the second BC device using the first PTP port.

Step S803: The first BC device receives, using the first PTP port, a peer delay-response packet that is sent by the second BC device using the second PTP port.

Step S804: The first BC device determines a mean path delay according to timestamp information generated by the peer delay-request packet and the peer delay-response packet.

Step S805: The first BC device determines the time synchronization offset according to the mean path delay and timestamp information that is generated by the synchronization packet.

Step S806: The first BC device sends, using the first PTP port, the synchronization packet that carries the time synchronization offset to the second PTP port of the second BC device.

The first BC device is an interface device that interfaces with the boundary device of the third-party network side and is in the upstream network, and the second BC device is an interface device that interfaces with the boundary device of the upstream network side and is in the third-party network.

In this embodiment, a PTP port of the first BC device, that is, the interface device that interfaces with the boundary device of the third-party network side and is in the upstream network, is set to a Passive state in the 1588V2 standard, or is defined as a new port state, that is, a Monitor state. Packet interaction between the first BC device and the second BC device complies with a Pdelay delay mechanism.

Figure 9:
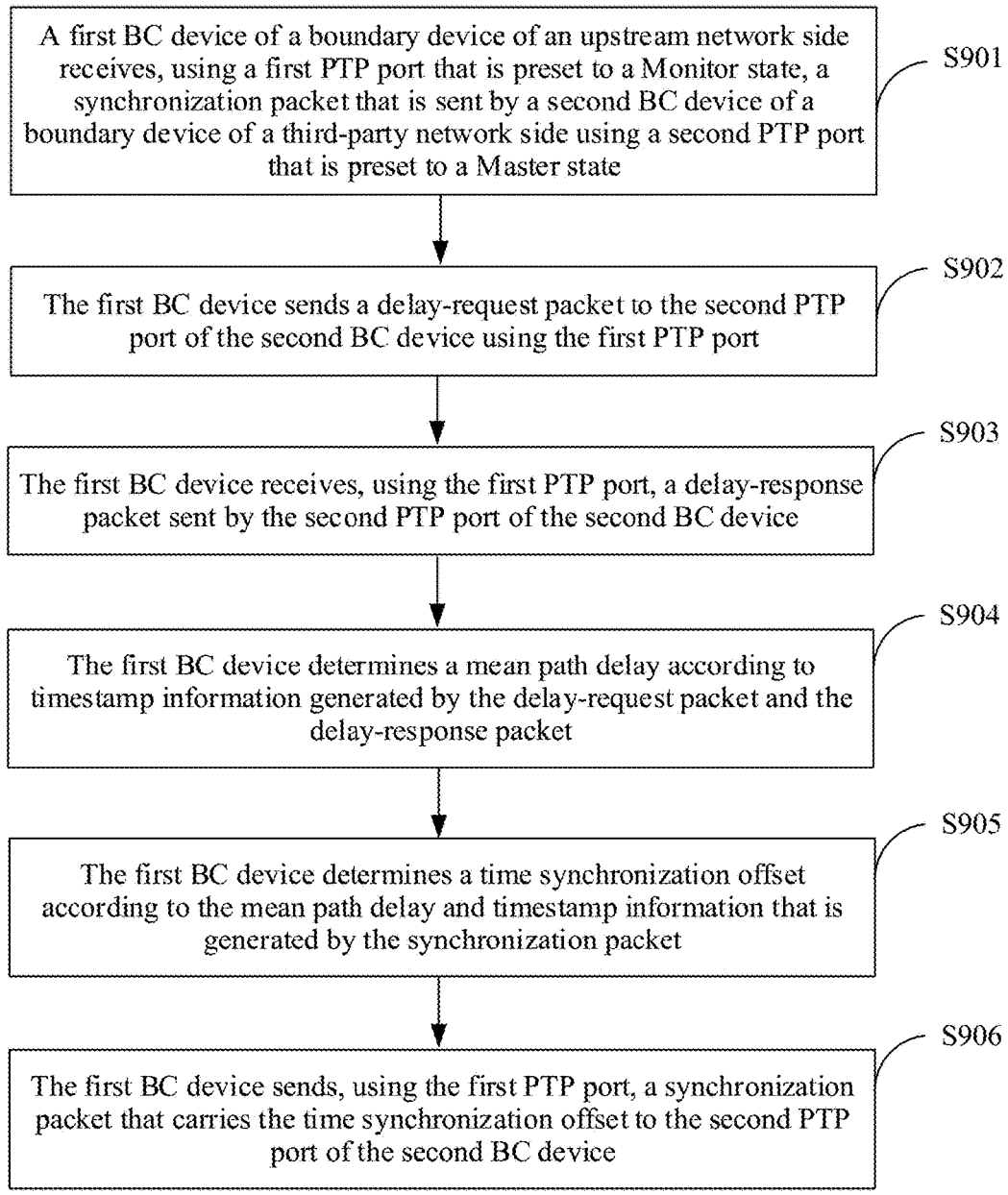
FIG. 9 is another schematic flowchart of implementation of step S701 in FIG. 7.

In another embodiment, as shown in FIG. 9, a procedure of determining, by the boundary device of the upstream network side, a time synchronization offset from a time domain of a third-party network may include the following steps.

Step S901: A first BC device of the boundary device of the upstream network side receives, using a first PTP port that is preset to a Monitor state, a synchronization packet that is sent by a second BC device of the boundary device of the third-party network side using a second PTP port that is preset to a Master state.

Step S902: The first BC device sends a delay-request packet to the second PTP port of the second BC device using the first PTP port.

Step S903: The first BC device receives, using the first PTP port, a delay-response packet sent by the second PTP port of the second BC device.

Step S904: The first BC device determines a mean path delay according to timestamp information generated by the delay-request packet and the delay-response packet.

Step S905: The first BC device determines the time synchronization offset according to the mean path delay and timestamp information that is generated by the synchronization packet.

Step S906: The first BC device sends, using the first PTP port, the synchronization packet that carries the time synchronization offset to the second PTP port of the second BC device.

The first BC device is an interface device that interfaces with the boundary device of the third-party network side and is in the upstream network, and the second BC device is an interface device that interfaces with the boundary device of the upstream network side and is in the third-party network.

In this embodiment, a PTP port of the first BC device, that is, the interface device that interfaces with the boundary device of the third-party network side and is in the upstream network, is preset to the monitor state, and packet interaction between the first BC device and the second BC device complies with a Delay mechanism.

In the foregoing embodiments, an implementation procedure of time synchronization is described from the perspective of a boundary device of an upstream network side. The following makes related description about a time synchronization process from the perspective of a boundary device of a downstream network side.

Figure 10:
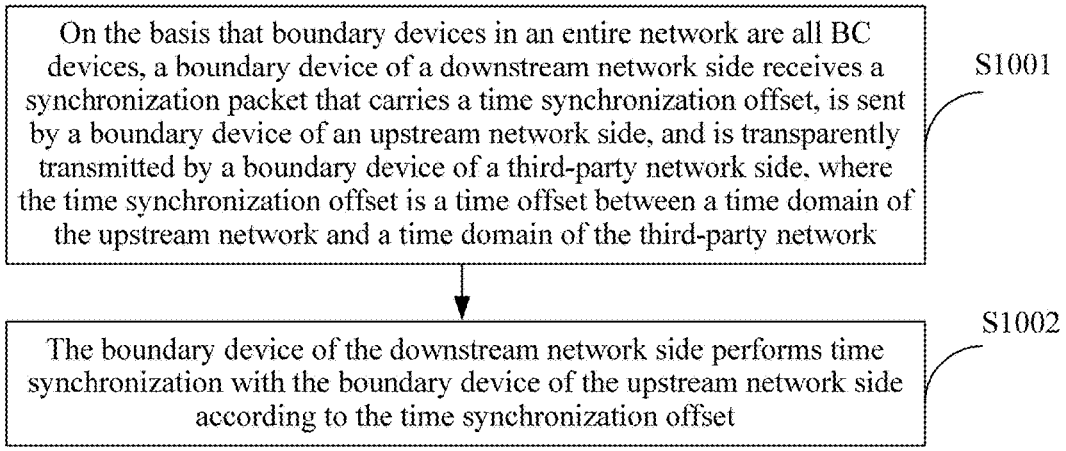
FIG. 10 is a schematic flowchart of time synchronization of a boundary device of a downstream network side according to the present application.

FIG. 10 is an overall procedure of time synchronization of a boundary device of a downstream network side, where the overall procedure includes the following steps.

Step S1001: On the basis that boundary devices in an entire network are all BC devices, the boundary device of the downstream network side receives a synchronization packet that carries a time synchronization offset, is sent by a boundary device of an upstream network side, and is transparently transmitted by a boundary device of a third-party network side, where the time synchronization offset is a time offset between a time domain of the upstream network and a time domain of the third-party network.

Step S1002: The boundary device of the downstream network side performs time synchronization with the boundary device of the upstream network side according to the time synchronization offset.

In this embodiment of the present application, in a synchronization mode in which boundary devices in an entire network are all BC devices, after a boundary device of an upstream network side learns a time offset between a time domain of the boundary device of the upstream network side itself and a time domain of a boundary device of an intermediate third-party network side, the boundary device of the upstream network side delivers a synchronization packet that carries the time offset to the boundary device of the third-party network side, and the boundary device of the third-party network side transparently transmits the synchronization packet to a boundary device of a downstream network side such that the boundary device of the downstream network side may perform time synchronization with the boundary device of the upstream network side according to the time offset. Because the boundary device of the third-party network side does not internally perceive transparently transmitted time, and directly transparently transmits the packet, original time synchronization of the boundary device of the third-party network side is not affected, and time synchronization within multiple time domains can be implemented in a scenario in which the time domain of the boundary device of the third-party network side is traversed.

Figure 11:
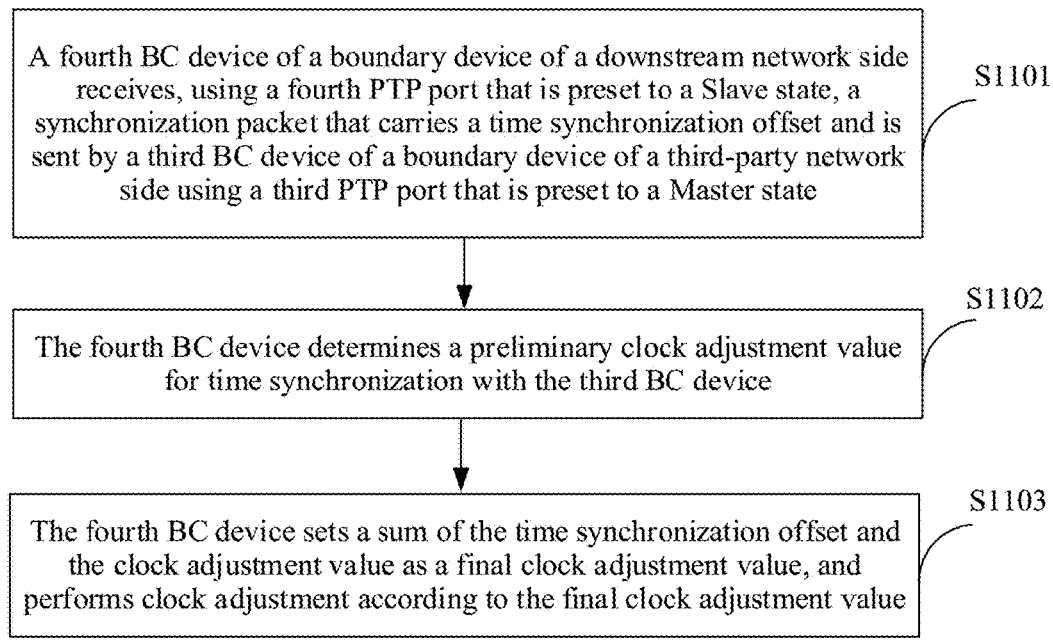
FIG. 11 is a schematic flowchart of implementation of step S1002 in FIG. 10.

Further, a manner of performing, by the boundary device of the downstream network side, time synchronization with the boundary device of the upstream network side according to the time synchronization offset is shown in FIG. 11, and includes the following steps.

Step S1101: A fourth BC device of the boundary device of the downstream network side receives, using a fourth PTP port that is preset to a Slave state, the synchronization packet that carries the time synchronization offset and is sent by a third BC device of the boundary device of the third-party network side using a third PTP port that is preset to a Master state.

Step S1102: The fourth BC device determines a preliminary clock adjustment value for time synchronization with the third BC device.

Step S1103: The fourth BC device sets a sum of the time synchronization offset and the clock adjustment value as a final clock adjustment value, and performs clock adjustment according to the final clock adjustment value.

In this implementation manner, for ease of description, a PTP port of the fourth BC device is referred to as a "fourth PTP port". The fourth PTP port of the fourth BC device is preset to the Slave state, and because the third PTP port of the third BC device is preset to the Master state, before receiving the synchronization packet that carries the time synchronization offset, the fourth BC device traces a clock of the boundary device of the third-party network side, and may determine the preliminary clock adjustment value for time synchronization with the third BC device. After receiving the synchronization packet that carries the time synchronization offset, the fourth BC device performs clock correction on a basis of the original clock according to the received time synchronization offset. That is, the sum of the time synchronization offset and the clock adjustment value is used as the final clock adjustment value, and clock adjustment is performed according to the final clock adjustment value such that a corrected clock is the same as a clock of the boundary device of the upstream network side. Therefore, time synchronization with the boundary device of the upstream network side is implemented.

To facilitate overall understanding of the foregoing technical solution, the following describes the foregoing time synchronization method using a specific application scenario.

Figure 12:
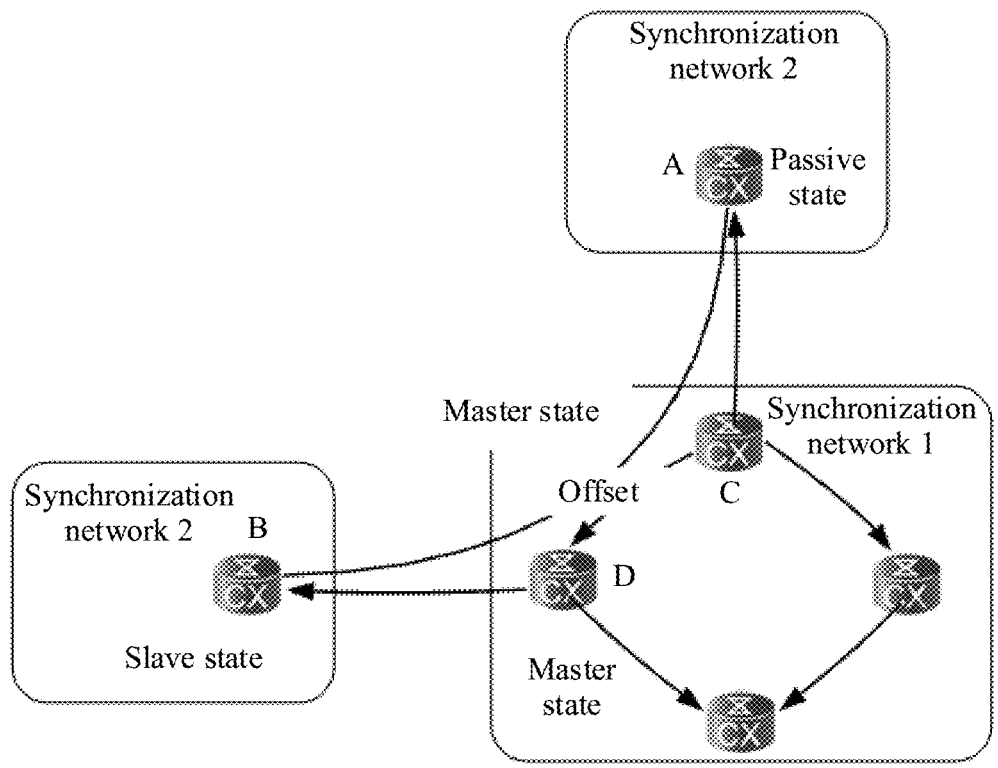
FIG. 12 is a schematic diagram of a scenario in which three-party networks perform time synchronization according to the present application.

As shown in FIG. 12, FIG. 12 is a schematic diagram of a scenario of time synchronization performed by three-party networks. Original synchronization networks 1 and 2 use a synchronization mode in which boundary devices in an entire network are all BC devices, it is required to implement that the synchronization network 2 traverses the synchronization network 1, and it is required that time of a downstream synchronization network 2 is not synchronized with time of the synchronization network 1, but synchronized with time of the upstream synchronization network 2. The synchronization network 1 is the foregoing third-party network. Boundary devices C and D in the synchronization network 1 are respectively an interface device that interfaces with an upstream network and an interface device that interfaces with a downstream network, a 1588 function of a PTP port is separately enabled on the devices C and D, and states of the PTP ports of the devices C and D are both preset to a Master state. A device A that is in the upstream synchronization network 2 is an interface device that interfaces with the synchronization network 1, and a device B that is in the downstream synchronization network 2 is a to-be-synchronized device and needs to be synchronized with the device A. The 1588 function is enabled for a PTP port of the device A, and a state of the PTP port may be configured as a Passive state of a Pdelay mode, or configured as a Monitor state that supports the Pdelay mode and a Delay mode. The device A calculates a time offset from the synchronization network 1, and sends the offset to the device C using a synchronization packet, and the device C forwards the synchronization packet to the device D in order to implement that the offset traverses the synchronization network 1 and is sent to the device B. A state of a PTP port of the device B is configured as a Slave state. Therefore, the device B uses a sum of the offset and a time synchronization adjustment value between the device B and the device D as a final time synchronization adjustment value, and adjusts a clock of the device B itself in order to finally implement time synchronization between the device B and the device A. The devices A, B, C, and D are all BC devices.

Corresponding to the foregoing time synchronization method embodiments, the present application provides a time synchronization device, applied to a third-party network.

Figure 13:
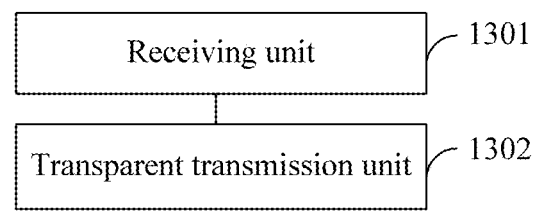
FIG. 13 is a schematic diagram of a time synchronization device applied to a third-party network according to the present application.

As shown in FIG. 13, the time synchronization device may include a receiving unit 1301 configured to receive a synchronization packet that carries a time synchronization offset and is delivered by a boundary device of an upstream network side, where the time synchronization offset is a time offset between a time domain of the upstream network and a time domain of the third-party network, and a transparent transmission unit 1302 configured to transparently transmit the synchronization packet that carries the time synchronization offset to a boundary device of a downstream network side such that the boundary device of the downstream network side performs time synchronization with the boundary device of the upstream network side according to the time synchronization offset.

The time synchronization device is disposed on a third-party network, after a boundary device of an upstream network side learns a time offset between a time domain of the boundary device of the upstream network side itself and a time domain of a boundary device of the intermediate third-party network side, the boundary device of the upstream network side delivers a synchronization packet that carries the time offset to the boundary device of the third-party network side, and the boundary device of the third-party network side transparently transmits the synchronization packet to a boundary device of a downstream network side such that the boundary device of the downstream network side may perform time synchronization with the boundary device of the upstream network side according to the time offset. Because the boundary device of the third-party network side does not internally perceive transparently transmitted time, and directly transparently transmits the packet, original time synchronization of the boundary device of the third-party network side is not affected, and time synchronization within multiple time domains can be implemented in a scenario in which the time domain of the boundary device of the third-party network side is traversed.

In a feasible embodiment, an implementation manner of the foregoing receiving unit 1301 may further include disposing a second BC device whose second PTP port is preset to a Master state, where the second BC device sends, using the second PTP port, a synchronization packet to a first PTP port that is of a first BC device of the boundary device of the upstream network side and is preset to a Passive state or a Monitor state, receives a peer delay-request packet that is sent by the first BC device using the first PTP port, sends a peer delay-response packet to the first BC device, and receives the synchronization packet that carries the time synchronization offset and is sent by the first BC device using the first PTP port, where the first BC device is an interface device that interfaces with the boundary device of the third-party network side and is in the upstream network, and the second BC device is an interface device that interfaces with the boundary device of the upstream network side and is in the third-party network.

In another feasible embodiment, an implementation manner of the foregoing receiving unit 1301 may further include disposing a second BC device whose second PTP port is preset to a Master state, where the second BC device sends, using the second PTP port, a synchronization packet to a first PTP port that is of a first BC device of the boundary device of the upstream network side and is preset to a Monitor state, receives a delay-request packet that is sent by the first BC device using the first PTP port, sends a delay-response packet to the first BC device, and receives the synchronization packet that carries the time synchronization offset and is sent by the first BC device using the first PTP port, where the first BC device is an interface device that interfaces with the boundary device of the third-party network side and is in the upstream network, and the second BC device is an interface device that interfaces with the boundary device of the upstream network side and is in the third-party network.

In addition, an implementation manner of the transparent transmission unit 1302 may further include a third BC device whose third PTP port is preset to a Master state, where the third BC device receives, using the third PTP port, the synchronization packet that carries the time synchronization offset and is sent by the second BC device using the second PTP port, and transparently transmits the synchronization packet to the boundary device of the downstream network side, where the third BC device is an interface device that interfaces with the boundary device of the downstream network side and is in the third-party network.

Corresponding to the foregoing time synchronization method embodiments, the present application provides a time synchronization device, applied to an upstream network.

Figure 14:
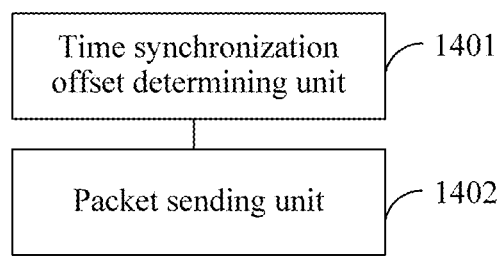
FIG. 14 is a schematic diagram of a time synchronization device applied to an upstream network according to the present application.

As shown in FIG. 14, the time synchronization device may include a time synchronization offset determining unit 1401 configured to determine a time synchronization offset from a time domain of a third-party network, where the time synchronization offset is a time offset between a time domain of the upstream network and the time domain of the third-party network, and a packet sending unit 1402 configured to deliver a synchronization packet that carries the time offset to a boundary device of the third-party network side such that the boundary device of the third-party network side transparently transmits the synchronization packet to a boundary device of a downstream network side, and the boundary device of the downstream network side performs time synchronization with a boundary device of the upstream network side according to the time synchronization offset.

The time synchronization device is disposed on an upstream network, after a boundary device of the upstream network side learns a time offset between a time domain of the boundary device of the upstream network side itself and a time domain of a boundary device of an intermediate third-party network side, the boundary device of the upstream network side delivers a synchronization packet that carries the time offset to the boundary device of the third-party network side, and the boundary device of the third-party network side transparently transmits the synchronization packet to a boundary device of a downstream network side such that the boundary device of the downstream network side may perform time synchronization with the boundary device of the upstream network side according to the time offset. Because the boundary device of the third-party network side does not internally perceive transparently transmitted time, and directly transparently transmits the packet, original time synchronization of the boundary device of the third-party network side is not affected, and time synchronization within multiple time domains can be implemented in a scenario in which the time domain of the boundary device of the third-party network side is traversed.

In a feasible embodiment, a specific implementation manner of the foregoing time synchronization offset determining unit 1401 may include receiving, using a first PTP port that is preset to a Passive state or a Monitor state, a synchronization packet that is sent by a second BC device of the boundary device of the third-party network side using a second PTP port that is preset to a Master state, sending a peer delay-request packet to the second PTP port of the second BC device using the first PTP port, receiving, using the first PTP port, a peer delay-response packet that is sent by the second BC device using the second PTP port, determining a mean path delay according to timestamp information generated by the peer delay-request packet and the peer delay-response packet, determining the time synchronization offset according to the mean path delay and timestamp information that is generated by the synchronization packet, and sending, using the first PTP port, the synchronization packet that carries the time synchronization offset to the second PTP port of the second BC device, where the second BC device is an interface device that interfaces with the boundary device of the upstream network side and is in the third-party network.

In a feasible embodiment, a specific implementation manner of the foregoing time synchronization offset determining unit 1401 may include receiving, using a first PTP port that is preset to a Monitor state, a synchronization packet that is sent by a second BC device of the boundary device of the third-party network side using a second PTP port that is preset to a Master state, sending a delay-request packet to the second PTP port of the second BC device using the first PTP port, receiving, using the first PTP port, a delay-response packet sent by the second PTP port of the second BC device, determining a mean path delay according to timestamp information generated by the delay-request packet and the delay-response packet, determining the time synchronization offset according to the mean path delay and timestamp information that is generated by the synchronization packet, and sending, using the first PTP port, the synchronization packet that carries the time synchronization offset to the second PTP port of the second BC device, where the second BC device is an interface device that interfaces with the boundary device of the upstream network side and is in the third-party network.

Corresponding to the foregoing time synchronization method embodiments, the present application provides a time synchronization device, applied to a downstream network.

Figure 15:
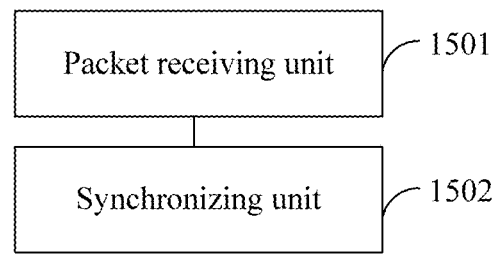
FIG. 15 is a schematic diagram of a time synchronization device applied to a downstream network according to the present application.

As shown in FIG. 15, the time synchronization device may include a packet receiving unit 1501 configured to receive a synchronization packet that carries a time synchronization offset, is sent by a boundary device of an upstream network side, and is transparently transmitted by a boundary device of a third-party network side, where the time synchronization offset is a time offset between a time domain of the upstream network and a time domain of the third-party network, and a synchronizing unit 1502 configured to perform time synchronization with the boundary device of the upstream network side according to the time synchronization offset.

The time synchronization device is disposed on a downstream network, after a boundary device of an upstream network side learns a time offset between a time domain of the boundary device of the upstream network side itself and a time domain of a boundary device of an intermediate third-party network side, the boundary device of the upstream network side delivers a synchronization packet that carries the time offset to the boundary device of the third-party network side, and the boundary device of the third-party network side transparently transmits the synchronization packet to a boundary device of the downstream network side such that the boundary device of the downstream network side may perform time synchronization with the boundary device of the upstream network side according to the time offset. Because the boundary device of the third-party network side does not internally perceive transparently transmitted time, and directly transparently transmits the packet, original time synchronization of the boundary device of the third-party network side is not affected, and time synchronization within multiple time domains can be implemented in a scenario in which the time domain of the boundary device of the third-party network side is traversed.

In a feasible embodiment, a specific implementation manner of the foregoing synchronizing unit 1502 may include receiving, using a fourth PTP port that is preset to a Slave state, the synchronization packet that carries the time synchronization offset and is sent by a third BC device of the boundary device of the third-party network side using a third PTP port that is preset to a Master state, determining a preliminary clock adjustment value for time synchronization with the third BC device, and setting a sum of the time synchronization offset and the clock adjustment value as a final clock adjustment value, and performing clock adjustment according to the final clock adjustment value, where the third BC device is an interface device that interfaces with the boundary device of the downstream network side and is in the third-party network.

Figure 16:
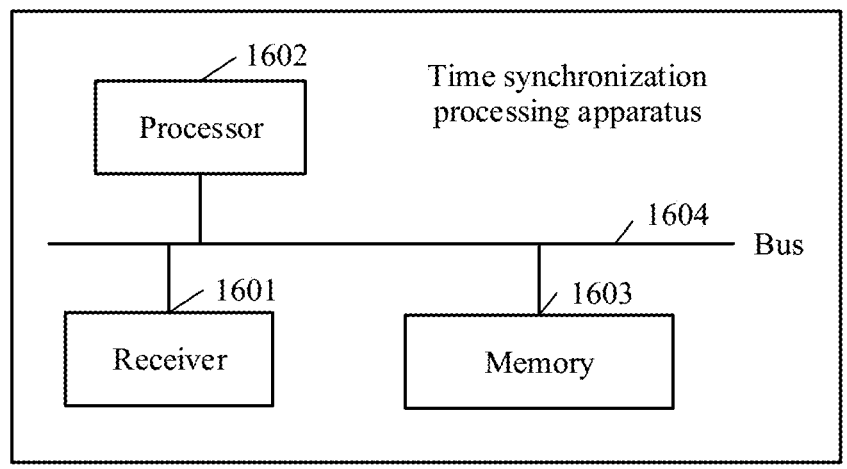
FIG. 16 is a schematic structural diagram of a time synchronization processing apparatus that is implemented based on a computer system according to the present application.

As shown in FIG. 16, the present application further provides a time synchronization processing apparatus that is implemented based on a computer system and applied to a third-party network. In specific implementation, the time synchronization processing apparatus may include a receiver 1601, a processor 1602, and a memory 1603, where the receiver 1601, the processor 1602, and the memory 1603 are connected using a bus 1604.

The memory 1603 is configured to store a computer execution instruction.

The receiver 1601 is configured to receive, on the basis that devices in an entire network are all BC devices, a synchronization packet that carries a time synchronization offset and is delivered by a boundary device of an upstream network side, where the time synchronization offset is a time offset between a time domain of the upstream network and a time domain of the third-party network.

The processor 1602 is configured to execute the computer execution instruction stored in the memory 1603, and transparently transmit the synchronization packet to a boundary device of a downstream network side such that the boundary device of the downstream network side performs time synchronization with the boundary device of the upstream network side according to the time synchronization offset.

Figure 17:
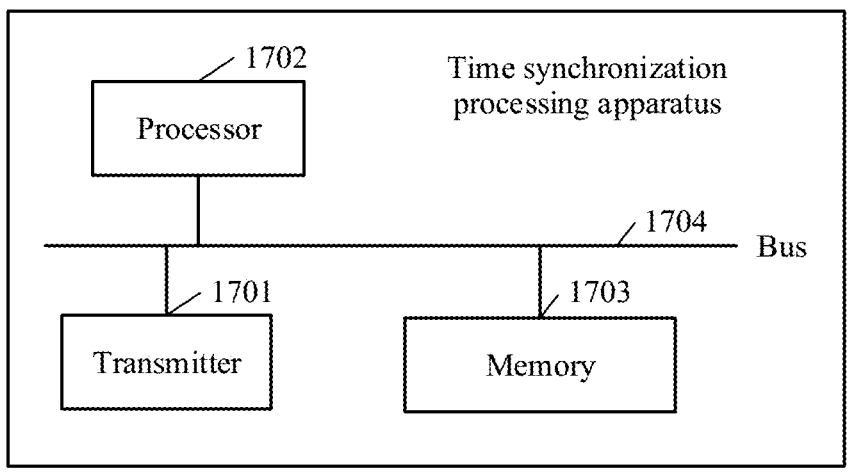
FIG. 17 is a schematic structural diagram of another time synchronization processing apparatus that is implemented based on a computer system according to the present application.

As shown in FIG. 17, the present application further provides a time synchronization processing apparatus that is implemented based on a computer system and is applied to an upstream network. In specific implementation, the time synchronization processing apparatus may include a transmitter 1701, a processor 1702, and a memory 1703, where the transmitter 1701, the processor 1702, and the memory 1703 are connected using a bus 1704.

The memory 1703 is configured to store a computer execution instruction.

The processor 1702 is configured to execute the computer execution instruction stored in the memory 1703, and determine, on the basis that boundary devices in an entire network are all BC devices, a time synchronization offset from a time domain of a third-party network, where the time synchronization offset is a time offset between a time domain of the upstream network and the time domain of the third-party network.

The transmitter 1701 is configured to deliver a synchronization packet that carries the time offset to a boundary device of a third-party network side such that the boundary device of the third-party network side transparently transmits the synchronization packet to a boundary device of a downstream network side, and the boundary device of the downstream network side performs time synchronization with a boundary device of the upstream network side according to the time synchronization offset.

Figure 18:
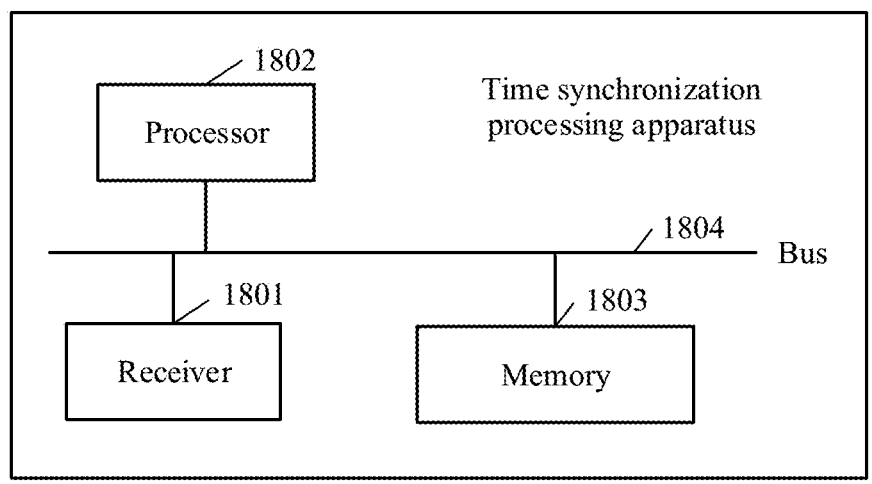
FIG. 18 is a schematic structural diagram of still another time synchronization processing apparatus that is implemented based on a computer system according to the present application.

As shown in FIG. 18, the present application further provides a time synchronization processing apparatus that is implemented based on a computer system and is applied to a downstream network. In specific implementation, the time synchronization processing apparatus may include a receiver 1801, a processor 1802, and a memory 1803, where the receiver 1801, the processor 1802, and the memory 1803 are connected using a bus 1804.

The memory 1803 is configured to store a computer execution instruction.

The receiver 1801 is configured to receive, on the basis that devices in an entire network are all BC devices, a synchronization packet that carries a time synchronization offset, is sent by a boundary device of an upstream network side, and is transparently transmitted by a boundary device of a third-party network side, where the time synchronization offset is a time offset between a time domain of the upstream network and a time domain of the third-party network.

The processor 1802 is configured to execute the computer execution instruction stored in the memory 1803, and perform time synchronization with the boundary device of the upstream network side according to the time synchronization offset.

In specific implementation, the foregoing processor 1602, 1702, and 1802 may be a central processing unit (CPU), an application-specific integrated circuit (ASIC), or the like. A computer storage medium can store a program, and when the program is executed, a part or all of steps in each embodiment of a time synchronization method provided in embodiments of the present application may be included. The foregoing storage medium may be a magnetic disk, an optical disc, a read-only memory (ROM), a random access memory (RAM), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the other approaches, or a part of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A time synchronization method, comprising:
   determining, by a boundary device of an upstream network side, a time synchronization offset from a time domain of a third-party network side by:
      receiving, by a first boundary clock (BC) device of the boundary device of the upstream network side using a first Precision Time Protocol (PTP) port preset to a passive clock state or a monitor clock state, a synchronization packet from a second BC device of the boundary device of the third-party network side using a second PTP port preset to a master clock state;
      sending, by the first BC device, a peer delay-request packet to the second PTP port of the second BC device using the first PTP port;
      receiving, by the first BC device using the first PTP port, a peer delay-response packet from the second BC device using the second PTP port;
      determining, by the first BC device, a mean path delay according to timestamp information generated by the peer delay-request packet and the peer delay-response packet;
      determining, by the first BC device, the time synchronization offset according to the mean path delay and timestamp information generated by the synchronization packet; and
      sending, by the first BC device using the first PTP port, the synchronization packet carrying the time synchronization offset to the second PTP port of the second BC device, wherein the first BC device is an interface device that interfaces with the boundary device of the third-party network side and is in the upstream network side, and wherein the second BC device is an interface device that interfaces with the boundary device of the upstream network side and is in the third-party network side, wherein the time synchronization offset is a time offset between a time domain of the upstream network side and the time domain of the third-party network side, and wherein a boundary device of the third-party network side is a BC device; and
   delivering, by the boundary device of the upstream network side, the synchronization packet carrying the time offset to the boundary device of the third-party network side to cause the boundary device of the third-party network side to transparently transmit the synchronization packet to a boundary device of a downstream network side.

2. A time synchronization method, comprising:
   determining, by a boundary device of an upstream network side, a time synchronization offset from a time domain of a third-party network side by:
      receiving, by a first boundary clock (BC) device of the boundary device of the upstream network side using a first Precision Time Protocol (PTP) port preset to a monitor clock state, a synchronization packet from a second BC device of the boundary device of the third-party network side using a second PTP port preset to a master clock state;
      sending, by the first BC device, a delay-request packet to the second PTP port of the second BC device using the first PTP port;
      receiving, by the first BC device using the first PTP port, a delay-response packet from the second PTP port of the second BC device;
      determining, by the first BC device, a mean path delay according to timestamp information generated by the delay-request packet and the delay-response packet;
      determining, by the first BC device, the time synchronization offset according to the mean path delay and timestamp information generated by the synchronization packet; and
      sending, by the first BC device using the first PTP port, the synchronization packet carrying the time synchronization offset to the second PTP port of the second BC device, wherein the first BC device is an interface device that interfaces with the boundary device of the third-party network side and is in the upstream network side, and wherein the second BC device is an interface device that interfaces with the boundary device of the upstream network side and is in the third-party network side, wherein the time synchronization offset is a time offset between a time domain of the upstream network side and the time domain of the third-party network side, and wherein a boundary device of the third-party network side is a BC device; and delivering, by the boundary device of the upstream network side, the synchronization packet carrying the time offset to the boundary device of the third-party network side to cause the boundary device of the third-party network side to transparently transmit the synchronization packet to a boundary device of a downstream network side.

3. A time synchronization method, comprising:

receiving, by a boundary device of a downstream network side from a boundary device of an upstream network side, a synchronization packet that carries a time synchronization offset, and that is transparently transmitted by a boundary device of a third-party network side, wherein the time synchronization offset is a time offset between a time domain of the upstream network side and a time domain of the third-party network side, and wherein the boundary device of the third-party network side is a boundary clock (BC) device; and performing, by the boundary device of the downstream network side, time synchronization with the boundary device of the upstream network side according to the time synchronization offset by:

receiving, by a fourth BC device of the boundary device of the downstream network side using a fourth Precision Time Protocol (PTP) port preset to a slave clock state, the synchronization packet carrying the time synchronization offset from a third BC device of the boundary device of the third-party network side using a third PTP port that is preset to a master clock state;

determining, by the fourth BC device, a preliminary clock adjustment value for the time synchronization with the third BC device;

setting, by the fourth BC device, a sum of the time synchronization offset and the preliminary clock adjustment value as a final clock adjustment value; and performing clock adjustment according to the final clock adjustment value, wherein the third BC device is an interface device that interfaces with the boundary device of the downstream network side and is in the third-party network side, and wherein the fourth BC device is an interface device that interfaces with the boundary device of the third-party network side and is in the downstream network side.

4. A time synchronization boundary clock (BC) device, comprising:

a processor configured to determine a time synchronization offset from a time domain of a third-party network side by:

receiving, using a first Precision Time Protocol (PTP) port preset to a passive clock state or a monitor clock state, a synchronization packet from a second BC device of a boundary device of the third-party network side using a second PTP port preset to a master clock state;

sending a peer delay-request packet to the second PTP port of the second BC device using the first PTP port;

receiving, using the first PTP port, a peer delay-response packet from the second BC device using the second PTP port;

determining a mean path delay according to timestamp information generated by the peer delay-request packet and the peer delay-response packet;

determining the time synchronization offset according to the mean path delay and timestamp information generated by the synchronization packet; and sending, using the first PTP port, the synchronization packet carrying the time synchronization offset to the second PTP port of the second BC device, wherein the second BC device is an interface device that interfaces with the boundary device of an upstream network side in the third-party network side, wherein the time synchronization offset is a time offset between a time domain of the upstream network side and the time domain of the third-party network side; and a transmitter coupled to the processor and configured to deliver a packet carrying the time offset to the boundary device of the third-party network side to cause the boundary device of the third-party network side to transparently transmit the packet to a boundary device of a downstream network side, and the boundary device of the downstream network side performs time synchronization with a boundary device of the upstream network side according to the time synchronization offset, wherein the boundary device of the third-party network side is a BC device.

5. A time synchronization boundary clock (BC) device, comprising:

a processor configured to determine a time synchronization offset from a time domain of a third-party network side by:

receiving, using a first Precision Time Protocol (PTP) port preset to a monitor clock state, a synchronization packet from a second BC device of a boundary device of the third-party network side using a second PTP port preset to a master clock state;

sending a delay-request packet to the second PTP port of the second BC device using the first PTP port;

receiving, using the first PTP port, a delay-response packet from the second PTP port of the second BC device;

determining, a mean path delay according to timestamp information generated by the delay-request packet and the delay-response packet;

determining the time synchronization offset according to the mean path delay and timestamp information generated by the synchronization packet; and sending, using the first PTP port, the synchronization packet carrying the time synchronization offset to the second PTP port of the second BC device, wherein the second BC device is an interface device that interfaces with the boundary device of an upstream network side and is in the third-party network side, wherein the time synchronization offset is a time offset between a time domain of the upstream network side and the time domain of the third-party network side; and a transmitter coupled to the processor and configured to deliver a packet carrying the time offset to the boundary device of the third-party network side to cause the boundary device of the third-party network side to transparently transmit the packet to a boundary device of a downstream network side, and the boundary device of the downstream network side performs time synchronization with a boundary device of the upstream network side according to the time synchronization offset, wherein the boundary device of the third-party network side is a BC device.

6. A time synchronization boundary clock (BC) device, comprising:
- a receiver configured to receive, from a boundary device of an upstream network side, a synchronization packet that is transparently transmitted from a boundary device of a third-party network side, wherein the synchronization packet comprises a time synchronization offset that is a time offset between a time domain of the upstream network side and a time domain of the third-party network side, wherein the boundary device of the third-party network side is a BC device; and
- a processor coupled to the receiver and configured to perform time synchronization with the boundary device of the upstream network side according to the time synchronization offset by:

receiving, using a fourth Precision Time Protocol (PTP) port preset to a slave clock state, the synchronization packet carrying the time synchronization offset from a third BC device of the boundary device of the third-party network side using a third PTP port preset to a master clock state;

determining a preliminary clock adjustment value for time synchronization with the third BC device;

setting a sum of the time synchronization offset and the preliminary clock adjustment value as a final clock adjustment value; and performing clock adjustment according to the final clock adjustment value, wherein the third BC device is an interface device that interfaces with the boundary device of a downstream network side and is in the third-party network side.

* * * * *